United States Patent [19]
Grajewski et al.

[11] Patent Number: 5,753,863
[45] Date of Patent: May 19, 1998

[54] SEALING ARRANGEMENT HAVING AN OUTER HOUSING AND AN INNER HYPERBOLIC TUBE FOR SEALING THE INLET AREA OF A LENGTHWISE EXTENDING SUSTRATE

[75] Inventors: Franz Grajewski; Werner Stieb, both of Stadthagen, Germany

[73] Assignee: Alcatel Kabel AG & Co., Germany

[21] Appl. No.: 653,767

[22] Filed: May 24, 1996

[30] Foreign Application Priority Data

May 26, 1995 [DE] Germany ............... 295 08 725.0

[51] Int. Cl.⁶ .................................................. H01B 7/26
[52] U.S. Cl. .................. 174/151; 174/65 R; 174/153 R; 277/178
[58] Field of Search .................. 174/151, 152 R, 174/152 G, 153 R, 153 G, 65 R, 65 G, 655 S, 167; 277/178, 165; 385/134, 135, 136

[56] References Cited

U.S. PATENT DOCUMENTS

| | | | |
|---|---|---|---|
| 2,468,985 | 5/1949 | Krotz | 403/225 |
| 3,193,335 | 7/1965 | Wing | 384/296 |
| 3,534,323 | 10/1970 | Becker et al. | 439/523 |
| 4,323,727 | 4/1982 | Berg | 174/135 |
| 5,204,499 | 4/1993 | Favalora | 174/65 R |
| 5,545,854 | 8/1996 | Ishida | 174/153 G |

FOREIGN PATENT DOCUMENTS

| | | |
|---|---|---|
| 2158992 | 5/1973 | European Pat. Off. |
| 0073748 | 3/1983 | European Pat. Off. |
| 599234 | 6/1934 | Germany |
| 900231 | 12/1953 | Germany |
| 2557330 A1 | 12/1975 | Germany |
| 2900518 | 7/1978 | Germany |
| 406-169517 A | 6/1994 | Japan |
| 371445 | 11/1973 | U.S.S.R. |

Primary Examiner—Kristine L. Kincaid
Assistant Examiner—Kamand Cuneo
Attorney, Agent, or Firm—Ware, Fressola, Van der Sluys & Adolphson LLP

[57] ABSTRACT

An arrangement for sealing the inlet area of a substrate extending lengthwise in a housing, preferably a communications cable in a sleeve, has the following features:

a) a tube (3) in the form of an elastomer hyperboloid is placed on a cable and has plastic moldings (4,5) at each of its ends firmly attached to the tube (3);

b) the elastomer tube (3) is under lengthwise-axial pressure, so that the central portion of the tube (3) is firmly pressed against the substrate (2) surface.

c) the tube (3) with its attached moldings (4,5) is located in a hollow body (9), which maintains the lengthwise-axial pressure; and d) the hollow body (9) is attached to the inlet area of the housing (1) and is sealed with respect to the inlet opening.

14 Claims, 3 Drawing Sheets

SEALING ARRANGEMENT HAVING AN OUTER HOUSING AND AN INNER HYPERBOLIC TUBE FOR SEALING THE INLET AREA OF A LENGTHWISE EXTENDING SUSTRATE

BACKGROUND OF THE INVENTION

1. Technical Field

The invention concerns an arrangement for sealing the inlet area of a substrate extending lengthwise in a housing, preferably a communications cable in a sleeve.

2. Description of the Prior Art

The use of heat-shrunk sleeves is known, e.g. for protecting the connection splices of communication cables, where a heat-shrinkable sleeve is placed over the connection splice, and the lengthwise edges are closed by a rail pushed over the thickened edge areas of the sleeve. The sleeve is made to shrink by the application of heat, e.g. by means of a gas flame. The sleeve then covers both the connection splice and the cables that enter into the sleeve. If more than one cable enters the sleeve from one side, or if more than one cable exits from one side of the sleeve, a clamp is placed between the cables entering or exiting from one end, which holds the sleeve areas between the cables together. A layer of hot-melt adhesive provides a good seal (DE-A-2 900 518).

A disadvantage of this sleeve is that the heat required to shrink the sleeve can have a detrimental effect on the cable and the splice, so that additional protective steps must be taken. Another disadvantage of these known sleeves is that the splice organizers used to connect optical cables require great effort to place them into a heat-shrinkable sleeve. However, an aggravating disadvantage of this type of sleeve is that after the sleeve has been opened, it can only be closed again by means of a new sleeve.

A thermoplastic clamping sleeve is known from DE-B2-21 58 992, which comprises two half-shells made of a thermoplastic material. The half-shells have flanges along the lengthwise edges, which have a conical cross section that expands in the lengthwise direction. Removable clamps or rails, which act as wedges, are used to hold the half-shells together. A viscous sealing material is placed on the adjoining areas of the half-shells to form a seal. Sealing material is also placed in the semicircular extensions which form the inlet area, to seal the gap between the cable jacket and the inlet opening. The inlet opening is built in steps for adaptation to different cable diameters. This sleeve has been used for a long time in the telecommunication field.

A disadvantage of this type of sleeve is that the inlet area must be handled separately both at the first installation as well as after reopening. In this way, with one type of sleeve the inlet opening must be bored, with a second type of sleeve the annular gap must be sprayed with a viscous sealing material, with another type the inlet opening must be adapted to the cable diameter by breaking off ring-shaped areas.

SUMMARY OF THE INVENTION

An object of the present invention is to provide a sleeve for communication cables, particularly optical communication cables, which can be used for different cables without any previous or subsequent operations, and can be installed without any auxiliary means such as gas burners, etc.

In accordance with the invention, a lengthwise-axially prestressed tube of elastomer material is able to adapt itself to different diameters, depending on how much the tube is prestressed. The prestressed condition is maintained by a hollow body in which the tube is mounted.

The invention will be fully understood when reference is made to the following detailed description taken in conjunction with the accompanying drawing.

DETAILED DESCRIPTION OF THE INVENTION

Figure 1:
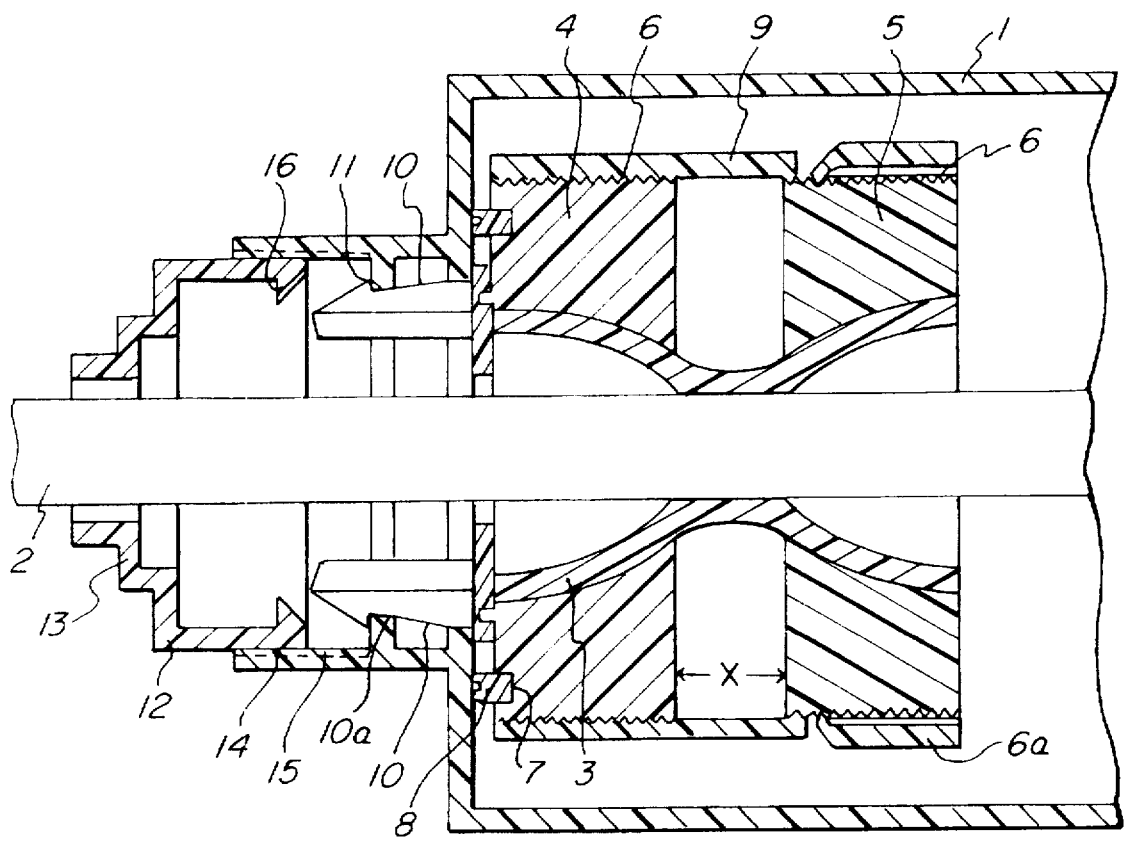
FIG. 1 is a cross-sectional view of the inlet area of a sleeve having a sealing arrangement in accordance with the present invention for protecting a connection splice of a communication cable.

Referring to FIG. 1, a sleeve or housing 1 can be reopened in accordance with the clamping sleeve principle, i.e., the sleeve 1 is composed of two half-shells not illustrated in detail, which are pressed together with clamping rails (not shown) in a manner well-known in the art. Elastic seals are provided on the interface areas between the half-shells.

A prestressed, hyperbolically shaped tube 3 made of an elastomer is placed over the substrate, e.g. cable 2, which enters (or exits from) the sleeve 1. Each of the two ends of tube 3 is connected to a plastic molding 4 and 5. During the injection process, the plastic moldings 4 and 5 are molded into one piece with the tube 3. A gap x is provided between the moldings 4 and 5. Depending on whether the gap x is increased or decreased, the inside diameter of tube 3 increases or decreases in the area between the moldings 4 and 5.

The moldings 4 and 5 are clamped into a hollow body or housing 9 made of two identical half-shells. The gap x can be changed and also fixed by a gripping mechanism 6 and 6a placed on the jacket surface of the moldings 4 and 5, and on the inside surface of the hollow housing 9. Pushing the moldings 4 and 5 together presses the inside wall of tube 3, because of its shape, against the outer surface of the cable 2. This condition is fixed by the gripping mechanism 6 and 6a. The function of the part 6a is to engage with the toothed surface 6 of the part 5 to fix the condition and to disengage in order to release the tension on the tube 3.

Figure 2:
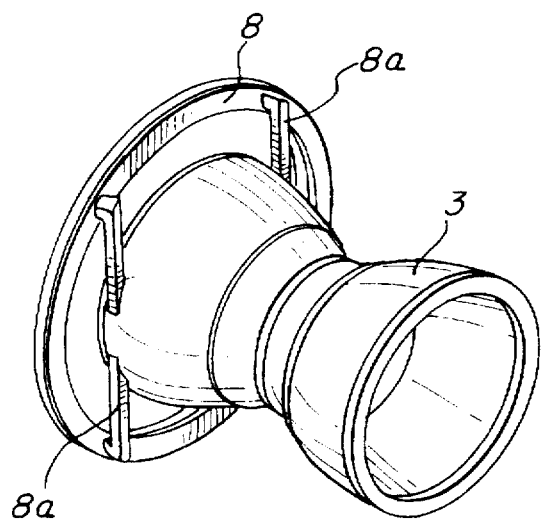
FIG. 2 is a perspective view of the prestressed, hyperbolically shaped tube with the seal ring.

On the end that faces away from molding 5, molding 4 has an annular groove 7 in which a sealing ring 8 is located. Turning to FIG. 2, the sealing ring 8 is made of the same material as the tube 3 and is injection molded into one piece with the latter, i.e. the sealing ring 8 is molded together with the tube 3 and connecting ribs 8a. Under pressure, the sealing ring 8 pushes against the inside end of sleeve 1, thereby sealing the inside of the sleeve against the outside. The pressure is maintained by snap hooks 10 which are uniformly distributed around the perimeter and are welded to the end of molding 4. The snap hooks 10 grip behind a disk 11 in the inlet area of sleeve 1.

Figure 3:
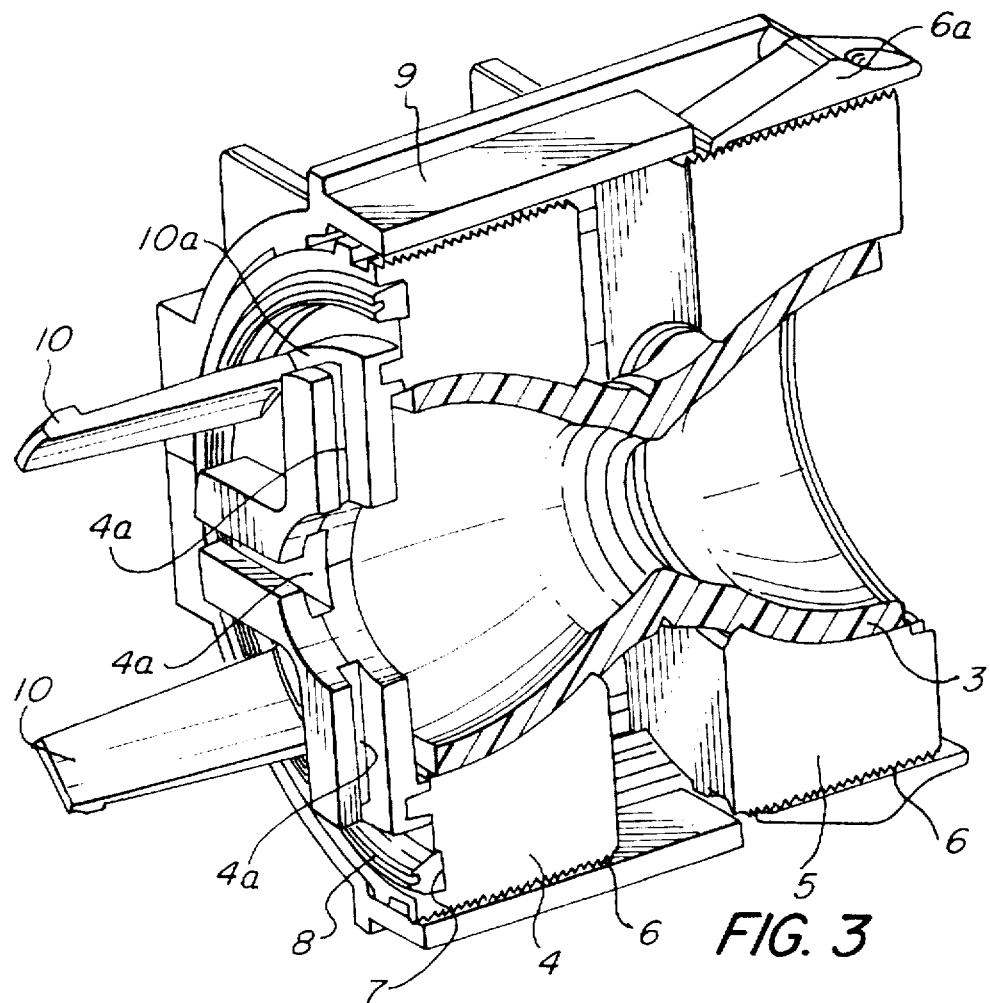
FIG. 3 is a perspective cross-sectional view of a portion of the sealing arrangement of the present invention with the sliding blocks removed for purposes of illustration.
Figure 4:
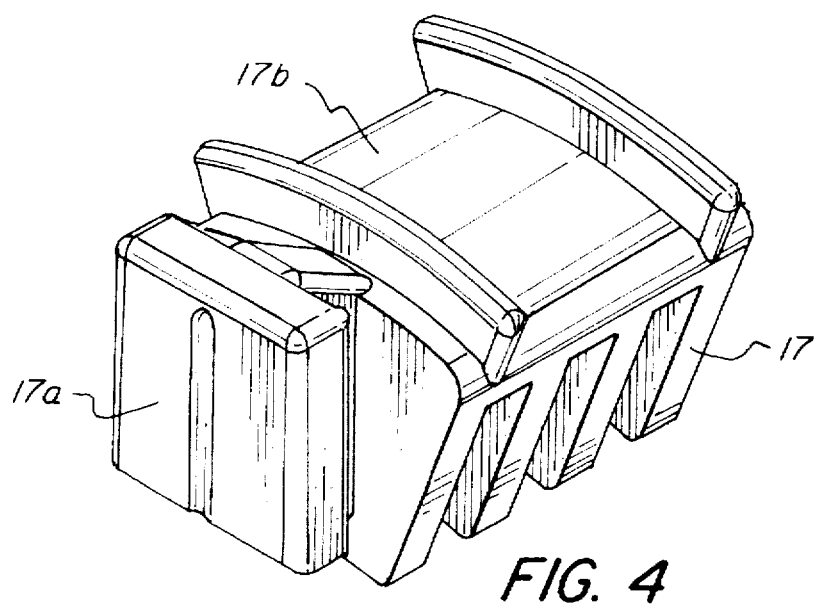
FIG. 4 is a perspective view of a sliding block.

As seen in FIG. 3, between the snap hooks 10, the end of the molding 4 or the snap hook ring 10a, which is attached to the molding 4, has four radially extending grooves 4a (three are illustrated) with a T-shaped cross section, into which sliding blocks 17 (FIG. 4) are inserted via portion 17a. These sliding blocks are supported by the cable 2 and secure the cable 2 by means of a cable tie (not shown), which surrounds all sliding blocks 17 in their peripheral grooves 17b on their perimeter and forces them against the cable 2 in the radial direction.

The inlet to the sleeve is closed by a cover 12, composed of two halves which are clinched over the cable 2 and are joined to form the cover 12. Steps 13 at the end of the cover make an adaptation to the cable 2 diameter possible.

The cover 12 has a bayonet fastening device which includes an alignment pin 14 on its outer perimeter, which fits into a corresponding groove 15 on the inside surface of the sleeve inlet. Pin 14 is designed to fit into groove 15 to make a mechanical connection as is well known to those skilled in the art. Groove 15 has a main portion with one or more sideways extensions. Pin 14 is first inserted longitudinally in the main portion of the groove and then turned into one of the sideways extensions to hold cover 12 in the sleeve inlet. The alignment pin 14 and the groove 15 are arranged so that four inward protruding triangular elements 16 oppose the snap hooks 10 on the inside perimeter of the cover 12. The cover 12 has two tasks. First, to prevent any unintentional opening. This is accomplished in that the groove 15 has a branch which runs in the peripheral direction. When the cover 12 is rotated, the alignment pin 14 fits into the branching groove at a predetermined position. Second, the cover 12 serves to make a reopening of the sleeve possible. To that end, the cover 12 is rotated backwards from its normal position and is then pushed onto the sleeve 1 in the lengthwise direction. At that point the triangular elements 16 press the snap hooks 10 inward, so that the snap hooks 10 no longer grip the disk 11, and the sealing element, which is composed of moldings 4 and 5, the tube 3 and the hollow housing 9, can be displaced.

Figure 5:
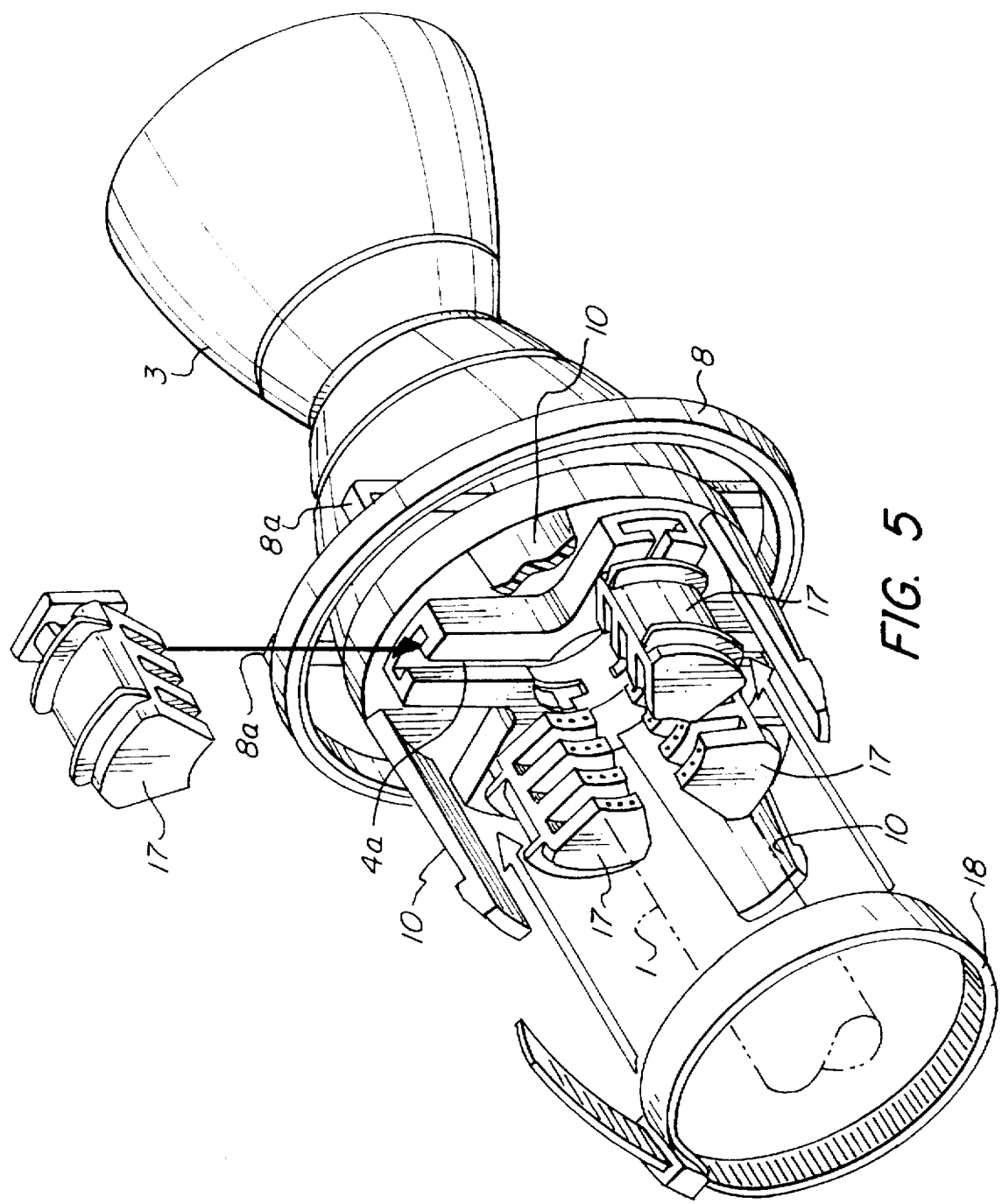
FIG. 5 is a perspective view of the sealing arrangement of the present invention with portions removed for purposes of illustration and showing the installation of the sliding blocks and cable tie.

When the sleeve 1 is installed, first the end of the cable 2 which enters or exits from the sleeve 1 is inserted by the user through the tube 3, and the user presses the moldings 4 and 5 together until the central part of the tube 3 fits tightly over the cable 2. This condition is maintained by the gripping mechanism 6 and 6a. Then, a cable tie 18 (FIG. 5) is placed and tightened around the sliding blocks 17, so that the cable 2 is secured. Then the sealing element, which is composed of the tube 3, the two moldings 4 and 5 and the hollow housing 9, is inserted into a cutout made in one of the housing halves.

After all sealing elements have been inserted in the same manner, the second sleeve-half is positioned and clamped to the first sleeve-half by means of the sliding rails described earlier.

Finally, the sealing element is drawn against the front end of the housing 9 or the sleeve 1 by pulling on the cable 2 outside of the housing 1, which firmly presses the sealing ring 8 against the front face. Now the snap hooks 10 grip behind the disk 11 and secure the sealing element.

In the assembled condition, neither the sealing ring 8 nor the sealed area between the tube 3 and the cable 2 are subjected to shear forces.

The preferred embodiment described above admirably achieves the objects of the invention. However, it will be appreciated that departures can be made by those skilled in the art without departing from the spirit and scope of the invention which is limited only by the following claims.

What is claimed is:

1. An arrangement for sealing comprising:
  a) a housing having an inlet opening for receiving a substrate;
  b) an elastomer hyperbolic tube within the housing and adapted to be placed on the substrate;
  c) plastic molding firmly attached at each end of the tube; and
  d) a hollow body having the tube with the moldings attached to each end being located at least partially therein whereby the hollow body maintains the tube under lengthwise-axial pressure so that a central portion of the tube is firmly pressed against the substrate to seal the inlet opening of the housing.

2. An arrangement as claimed in claim 1, wherein the plastic molding facing the inlet opening has an annular groove that is concentric with the substrate, the annular groove contains a sealing ring made of an elastomer that is attached to the tube.

3. An arrangement as claimed in claim 1, further including a gripping system provided on an inside surface of the hollow body and on an outer surface of the moldings whereby the lengthwise-axial pressure on the tube can be changed in small increments.

4. An arrangement as claimed in claim 1, further including a closing cover, which is attached to the housing by a bayonet fastening device.

5. An arrangement as claimed in claim 4, wherein the closing cover has several steps of different diameters extending away from the housing.

6. An arrangement as claimed in claim 4, wherein the housing is a sleeve.

7. An arrangement as claimed in claim 1, wherein the moldings each have at least three radially extending grooves in which sliding blocks are inserted.

8. An arrangement as claimed in claim 7, wherein the sliding blocks have a peripheral groove in their perimeter.

9. An arrangement as claimed in claim 1, further including at least three snap hooks protruding from at least one of the moldings, the snap hooks are adapted to grip a disk adjacent the inlet opening of the housing.

10. An arrangement as claimed in claim 8, further including a closing cover, which is attached to the housing by a bayonet fastening device.

11. An arrangement as claimed in claim 10, wherein the closing cover has several steps of different diameters extending away from the housing.

12. An arrangement as claimed in claim 9, wherein the closing cover has at least three protrusions which are adapted to disconnect the snap hooks from the disk.

13. An arrangement as claimed in claim 10, wherein the housing is a sleeve.

14. An arrangement as claimed in claim 1, wherein the housing is a sleeve.

* * * * *